US012244075B2

(12) United States Patent
Buckley

(10) Patent No.: US 12,244,075 B2
(45) Date of Patent: Mar. 4, 2025

(54) HIGHER ORDER FLOQUET MODE SCATTERING SYMMETRIC DUAL POLARIZED RADIATING ELEMENT

(71) Applicant: Hughes Network Systems, LLC, Germantown, MD (US)

(72) Inventor: Michael Joseph Buckley, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 352 days.

(21) Appl. No.: 17/955,372

(22) Filed: Sep. 28, 2022

(65) Prior Publication Data

US 2023/0093931 A1 Mar. 30, 2023

Related U.S. Application Data

(60) Provisional application No. 63/249,460, filed on Sep. 28, 2021.

(51) Int. Cl.

*H01Q 3/34* (2006.01)
*H01Q 1/48* (2006.01)
*H01Q 1/50* (2006.01)
*H01Q 1/52* (2006.01)

(52) U.S. Cl.

CPC ................ *H01Q 3/34* (2013.01); *H01Q 1/48* (2013.01); *H01Q 1/50* (2013.01); *H01Q 1/521* (2013.01)

(58) Field of Classification Search

CPC .. H01Q 3/34; H01Q 1/48; H01Q 1/50; H01Q 1/521
USPC .......................................................... 342/372
See application file for complete search history.

(56) References Cited

U.S. PATENT DOCUMENTS

| | | | | |
|---|---|---|---|---|
| 9,356,360 | B1 | 5/2016 | Buckley et al. | |
| 11,018,425 | B1 * | 5/2021 | Hageman | H01Q 3/267 |
| 2024/0322446 | A1 * | 9/2024 | Favreau | H01Q 21/062 |

* cited by examiner

*Primary Examiner* — Harry K Liu
(74) *Attorney, Agent, or Firm* — Mannava & Kang, P.C.

(57) ABSTRACT

A system having a radiating element is disclosed. The radiating element may include a plurality of higher order floquet mode scattering (HOFS) layers including at least a lowest layer unit cell, a middle layer unit cell, and a highest layer unit cell. The radiating element may also include a stripline feed layer having a ground plane layer. The ground plane layer is configured in at least one of a non-equilateral triangular grid unit cell or an equilateral triangular grid., one or more horizontal and vertical polarization stripline feeds, one or more horizontal and vertical polarization ground plane slots, and one or more ground vias to create an evanescent waveguide for resonance free stripline to radiating element coupling. The radiating element may be dual-polarized aperture coupled with an active electronically scanned array (AESA) in a manner so as to enable the AESA to electronically steer a beam of radio waves to point in different directions without moving the AESA and radiate beams of radio waves at multiple frequencies simultaneously.

20 Claims, 17 Drawing Sheets

300A

300A

400B

400F

400H

400I

400J

500

HIGHER ORDER FLOQUET MODE SCATTERING SYMMETRIC DUAL POLARIZED RADIATING ELEMENT

PRIORITY CLAIM

This patent application claims priority to U.S. Provisional Patent Application No. 63/249,460, filed with the US Patent Office on Sep. 28, 2021, the disclosure of which is incorporated by reference in its entirety.

TECHNICAL FIELD

This patent application is directed to applications of Active Electronically Scanned Arrays (AESA) in satellite communication systems and/or dual polarized antenna systems, and more specifically the patent application is directed to systems and methods for providing a higher order floquet mode scattering symmetrical dual polarized radiating element.

BACKGROUND

Advances in telecommunications technologies are providing consumers with more access to voice and data services. Satellite communication systems may be used to provide voice and data services. However, as telecommunications technologies continue to advance, satellite communication systems must adapt to increasing consumer demand, swelling constraints of regulatory requirements, and provisioning of quality services. These and other issues may create technical challenges.

SUMMARY

The present disclosure pertains to a radiating element that includes a plurality of higher order floquet mode scattering (HOFS) layers including at least a lowest layer unit cell, a middle layer unit cell, and a highest layer unit cell. The radiating element further includes a stripline feed layer that further includes a ground plane layer, one or more horizontal and vertical polarization stripline feeds, one or more horizontal and vertical polarization ground plane slots, and one or more ground vias. The stripline feed layer creates an evanescent waveguide for resonance-free stripline to radiating element coupling. The radiating element is aperture coupled with an active electronically scanned array (AESA) in a manner so as to enable the AESA to electronically steer a beam of radio waves to point in different directions without moving the AESA and radiate beams of radio waves at multiple frequencies simultaneously.

The present disclosure relates to a system having a radiating element that includes a plurality of higher order floquet mode scattering (HOFS) layers including a lowest layer unit cell, a middle layer unit cell, and a highest layer unit cell. The radiating element further includes a stripline feed layer having at least one of a ground plane layer, one or more horizontal and vertical polarization stripline feeds, one or more horizontal and vertical polarization ground plane slots, or one or more ground vias, wherein the stripline feed layer creates an evanescent waveguide for resonance-free stripline to radiating element coupling. The radiating element is aperture coupled with an active electronically scanned array (AESA) in a manner so as to enable the AESA to electronically steer a beam of radio waves to point in different directions without moving the AESA and radiate beams of radio waves at multiple frequencies simultaneously.

The present disclosure further relates to an apparatus having a higher order floquet mode scattering symmetrical dual polarized radiating element, wherein the radiating element includes a plurality of higher order floquet mode scattering (HOFS) layers including at least a lowest layer unit cell, a middle layer unit cell, and a highest layer unit cell, each comprising a low loss flame retardant epoxy resin (FR-4) material such as a Megtron 6, and a PCB metal, and a stripline feed layer comprising two or more low loss FR-4 material with 6 cores such as Megtron 6 cores. The stripline feed layer further includes a ground plane layer, one or more horizontal and vertical polarization stripline feeds, one or more horizontal and vertical polarization ground plane slots, and one or more ground vias to create an evanescent waveguide for resonance-free stripline to radiating element coupling. The radiating element is aperture coupled with an active electronically scanned array (AESA) in a manner so as to enable the AESA to electronically steer a beam of radio waves to point in different directions without moving the AESA and radiate beams of radio waves at multiple frequencies simultaneously.

BRIEF DESCRIPTION OF DRAWINGS

Features of the present disclosure are illustrated by way of example and not limited in the following Figure(s), in which like numerals indicate like elements, in which.

DETAILED DESCRIPTION

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms “a” and “an” are intended to denote at least one of a particular element, the term “includes” means includes but not limited to, the term “including” means including but not limited to, and the term “based on” means based at least in part on.

Figure 1:
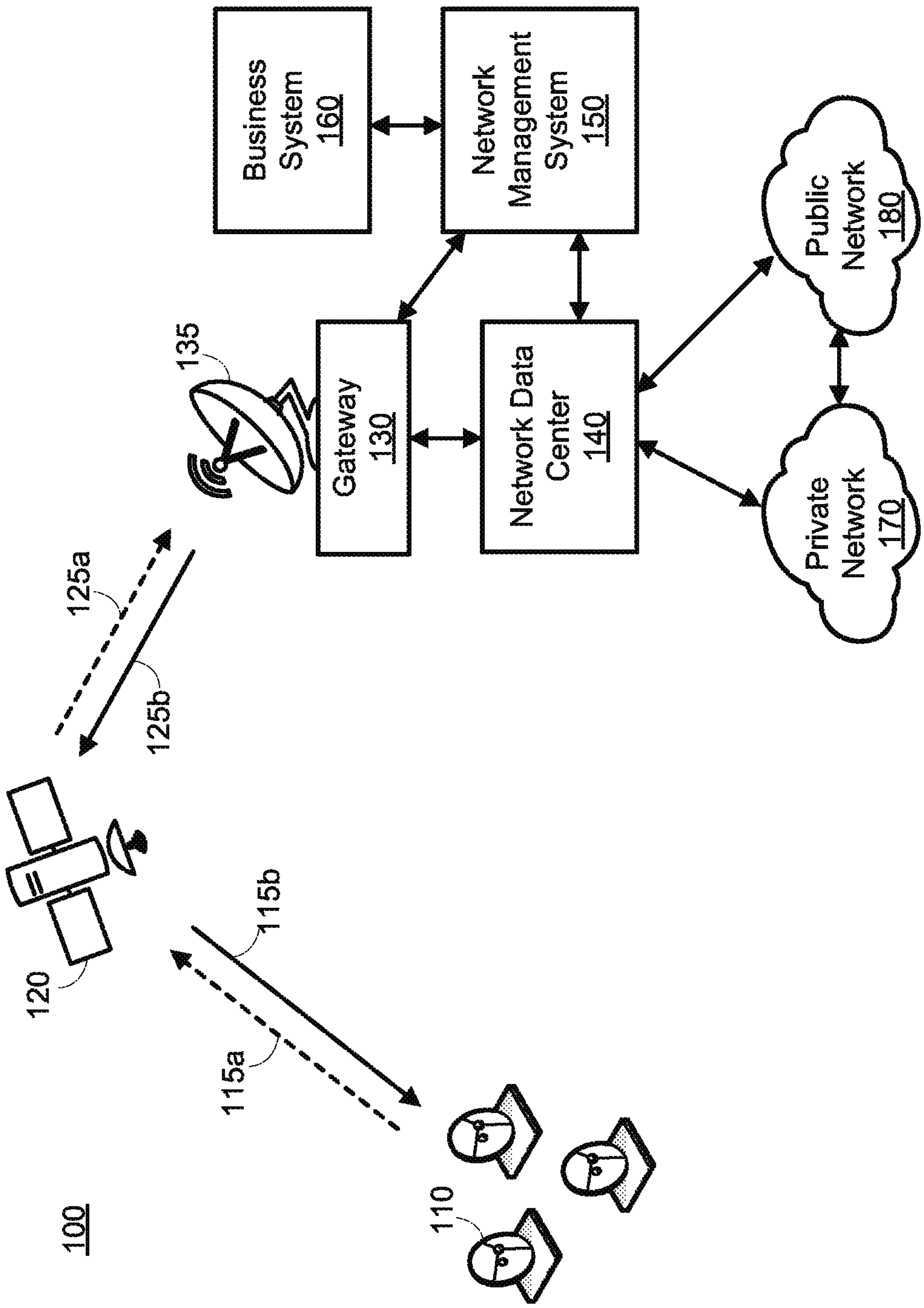
FIG. 1 illustrates a satellite communication system using a higher order floquet mode scattering symmetrical dual polarized radiating element, according to an example.

FIG. 1 illustrates a satellite communication system using a higher order floquet mode scattering symmetrical dual polarized radiating element, according to an example. In some examples, the system 100 may depict a satellite communication system capable of providing at least voice and/or data services. In some examples, the satellite communication system may be a high throughput satellite (HTS) system. The system 100 may include any number of terminals 110, a satellite 120, a gateway 130, a network data center 140, a network management system (NMS) 150, a business system 160, or other various system elements or components. The system 100 may also include a private network 170 and/or public network 180. It should be appreciated that the system 100 depicted in FIG. 1 may be an example. Thus, the system 100 may or may not include additional features and some of the features described herein may be removed and/or modified without departing from the scopes of the system 100 outlined herein.

The systems and methods described herein may provide a higher order floquet mode scattering symmetrical dual polarized radiating element, according to an example. As described herein, a low profile planar radiating element with excellent scan performance and frequency bandwidth capable of being integrated into a 45 degree slant meander line polarizer may be provided. This radiating element may have a $0.3125\lambda^2$ unit cell instead of a $0.25\lambda^2$ unit cell. This may reduce AESA module count by 20% (0.25/0.3125=0.8). Modules may be a significant contributor to AESA costs. This element may be symmetrical, resulting in a low cross-talk between horizontal and vertical polarizations low cross-polarization in the intercardinal scan, and increased gain.

The higher order floquet mode scattering symmetrical dual polarized radiating element as provided herein may address a low-cost AESA market. Low-cost AESA's may be a potential solution to low earth orbiting satellite (LEOS) earth to satellite ground station terminal opportunity. This radiating element may also substantially reduce system cost and thermal load by reducing module count by 20%. In some examples, this element may use low-loss flame retardant epoxy resin (FR4) materials for low cost and manufacturability. The FR4 (or FR-4) may refer to a NEMA grade designation for glass-reinforced epoxy laminate material used in printed circuit boards (PCBs). Thus, the higher order floquet mode scattering symmetrical dual polarized radiating element as provided herein may have applicability to various low earth orbiting (LEO), medium earth orbiting (MEO), and/or geosynchronous (GEO) satellite systems. Further, the present disclosure may apply to a high performance Depart of Defence (DoD) systems and/or also be used as a linearly polarized radiating element for any related applications using both low-cost and high-performance systems.

Figure 2:
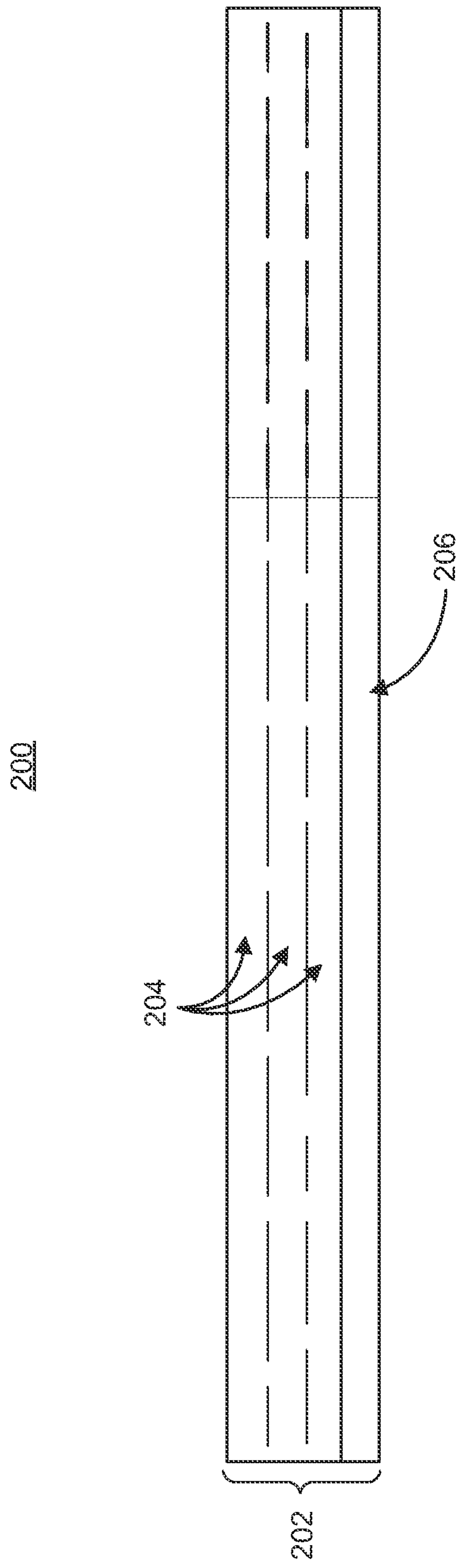
FIG. 2 illustrates a cross-sectional view of a higher order floquet mode scattering symmetrical dual polarized radiating element, according to an example.

FIG. 2 illustrates a cross-sectional view (i.e., diagram 200) of a higher order floquet mode scattering (HOFS) symmetrical dual polarized radiating element, according to an example. As shown, the diagram 200 depicts the higher order floquet mode scattering (HOFS) parts 204 of a printed circuit board (PCB) stack 202. In some examples, the PCB stack 202 may include low loss FR-4 material such as 3×20 Megtron 6 cores or other similar configurations. As shown, a stripline feed layer 206 may include low loss FR-4 material such as one (1) 10 mil Megtron 6 core and one (1) 5 mil Megtron 6 core. In some examples, a total PCB stack height of 75 mils may be provided. Although Megtron 6 is used throughout to refer to a specific PCB material, it should be appreciated that the systems and methods described herein may use any low-loss material, such as FR4, Teflon materials such as Rogers 3003, or other similar material. Other various dimensions, sizes, shapes, or configurations may also be provided.

FIGS. 3A-3D illustrate various top down views 300A-300D of layers associated with higher order floquet mode scattering symmetrical dual polarized radiating element, according to an example. As shown, view 300A of FIG. 3A may be a top-down view of a stripline feed layer 306, which is the same or similar to the stripline feed layer 206 of FIG. 2. Furthermore, a ground plane layer 310 in a non-equilateral triangular grid unit cell may be provided in order to further improve radiating element performance. In some examples, a parallelogram angle of 312 of 56.97613 degrees may be provided. In some examples, in the equilateral triangular grid the parallelogram angle of 60 degrees may be provided. In some examples, horizontal and vertical polarization stripline feeds 314 may be provided. Also, horizontal and vertical polarization ground plane slots 316 may be provided. In some examples, Megtron 6 or other low-loss FR4 material may be used. In some examples, ground vias 318 may be provided. These ground vias 318 may help create an evanescent waveguide for resonance-free stripline to radiating element coupling. Other various components, dimensions, sizes, shapes, or configurations may also be provided.

Figure 3A:
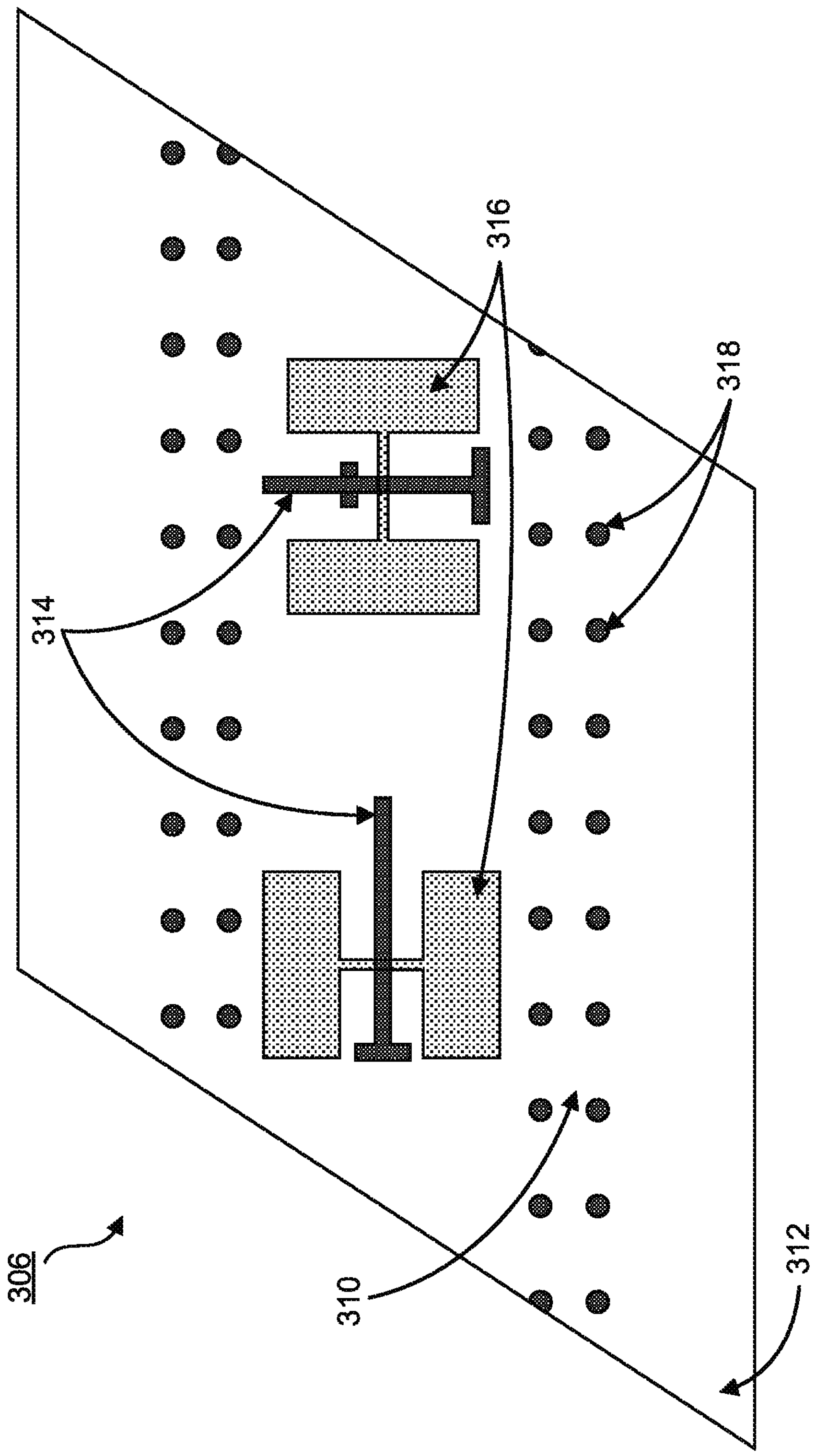
FIGS. 3A-3D illustrate various top-down views of layers associated with higher order floquet mode scattering symmetrical dual polarized radiating element, according to an example.
Figure 3B:
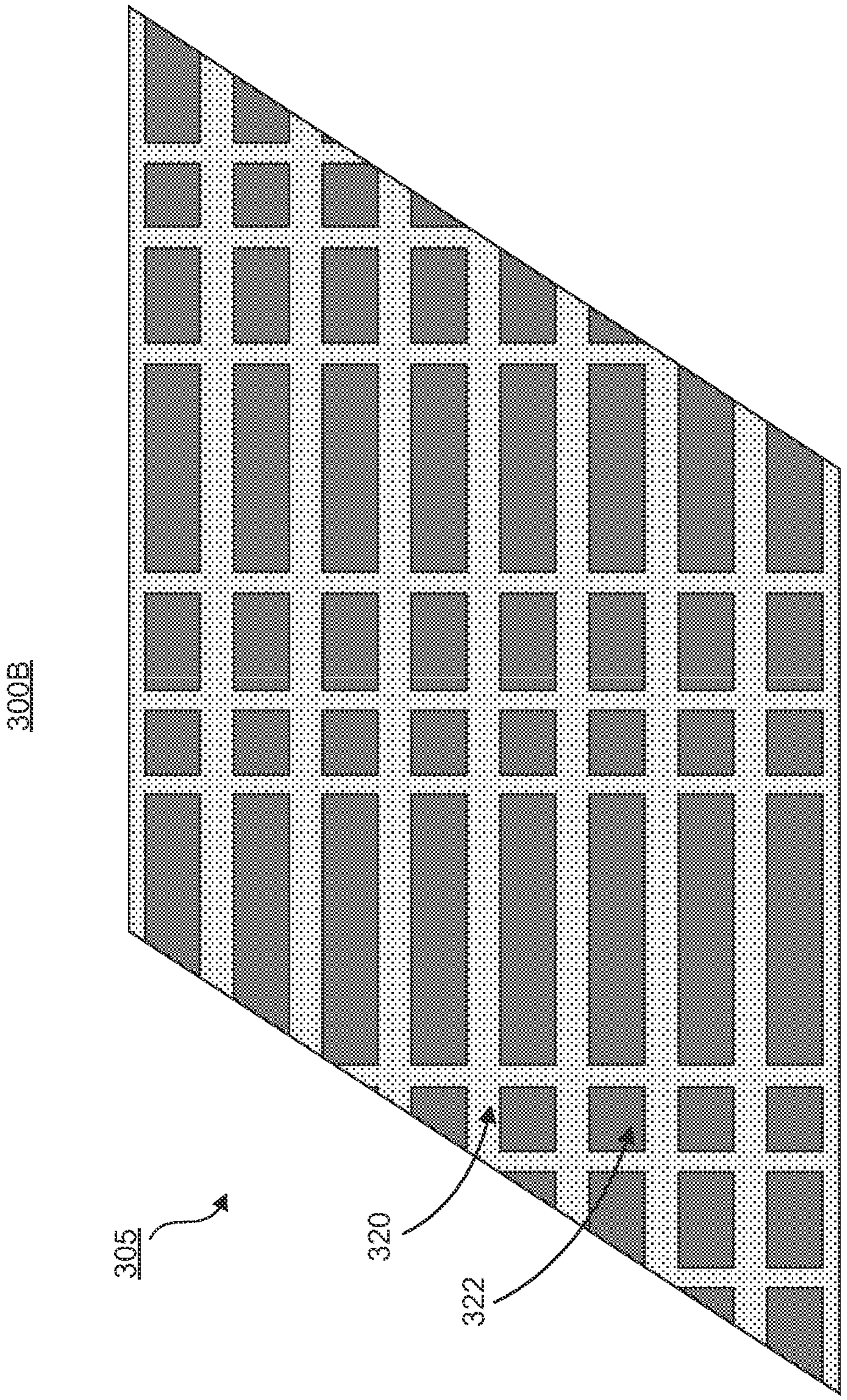

As shown, view 300B of FIG. 3B may be a top-down view of a higher order floquet mode scattering (HOFS) layer. In some examples, the top-down view may be of a lowest HOFS layer 305 unit cell. In some examples, the lowest HOFS layer 305 may include Megtron 6 320, PCB metal 322, and/or other elements, and in any number of configurations, orientations, and shapes. The configuration shown in FIG. 3B is one example. It should be appreciated that PCB metal may include copper, lead, aluminum, iron, tin, cadmium, nickel, or any combination thereof.

Figure 3C:
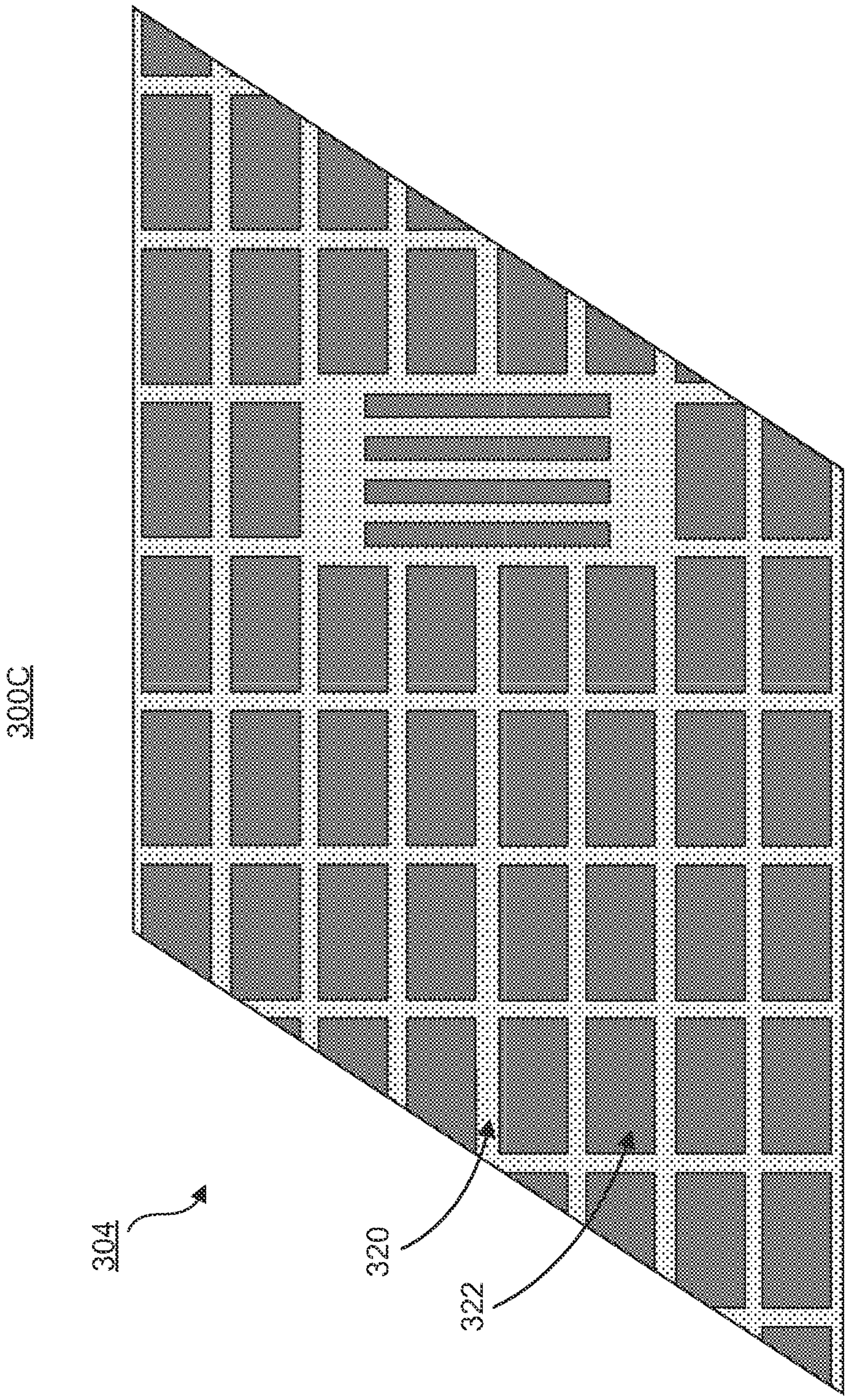

View 300C of FIG. 3C may be a top-down view of a higher order floquet mode scattering (HOFS) layer. In some examples, the top-down view may be of a middle HOFS layer 304 unit cell. In some examples, the middle HOFS layer 304 may include Megtron 6 320, PCB metal 322, and/or other elements, and in any number of configurations, orientations, and shapes. The configuration shown in FIG. 3C is one example.

Figure 3D:
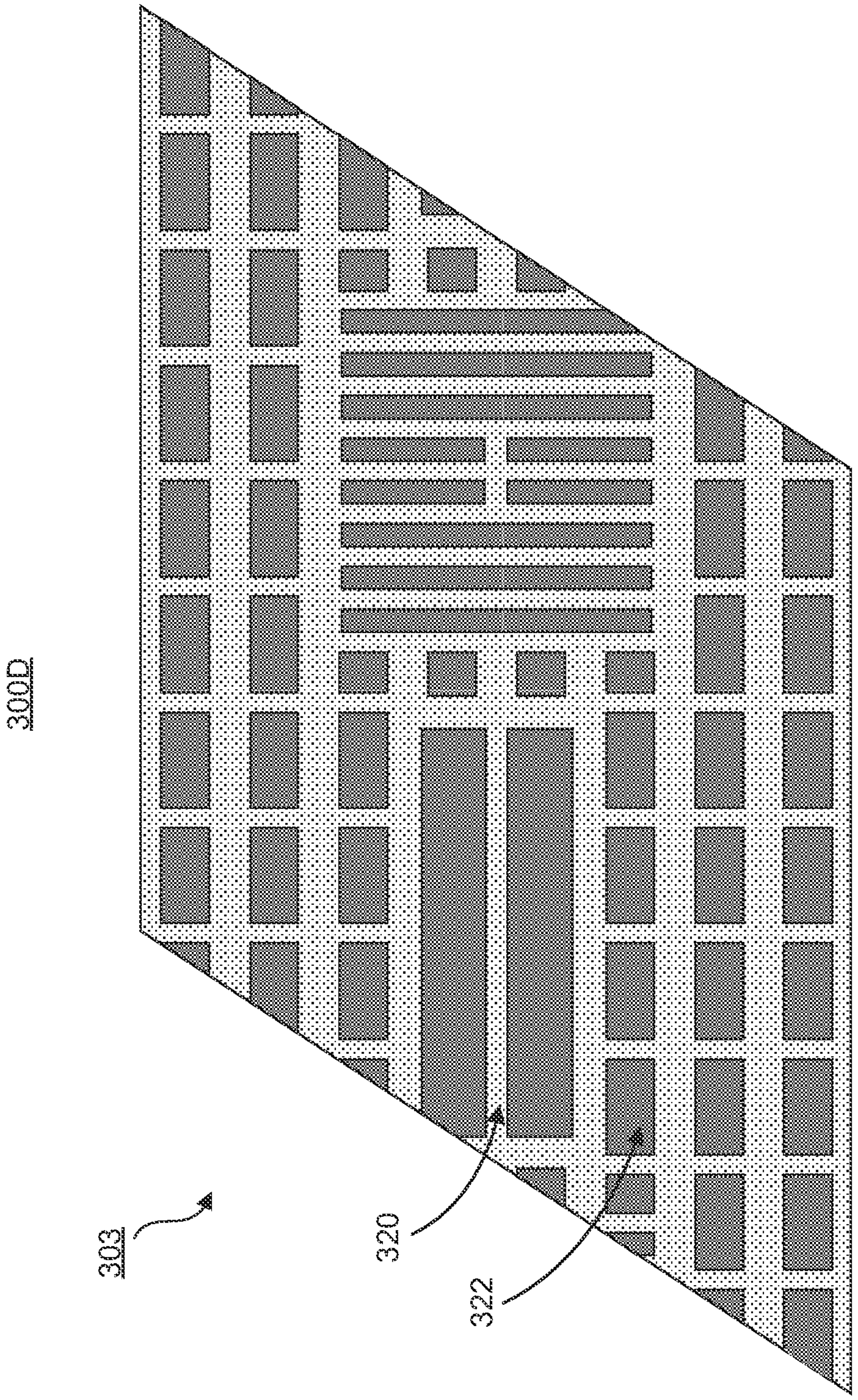

View 300D of FIG. 3D may be a top-down view of a higher order floquet mode scattering (HOFS) layer. In some examples, the top-down view may be of a highest HOFS layer 303 unit cell. In some examples, the highest HOFS layer 303 may include Megtron 6 320, PCB metal 322, and/or other elements, and in any number of configurations, orientations, and shapes. The configuration shown in FIG. 3D is one example.

Although the Megtron 6 320 and/or PCB metal 322 are depicted in certain shapes and configurations in the various layers 303-306, as shown in these views 300A-300D, it should be appreciated that any number of shapes, dimensions, orientations, designs, and configurations may also be provided to achieve the functional benefits and advantages of the higher order floquet mode scattering symmetrical dual polarized radiating element, as described herein.

Figure 4A:
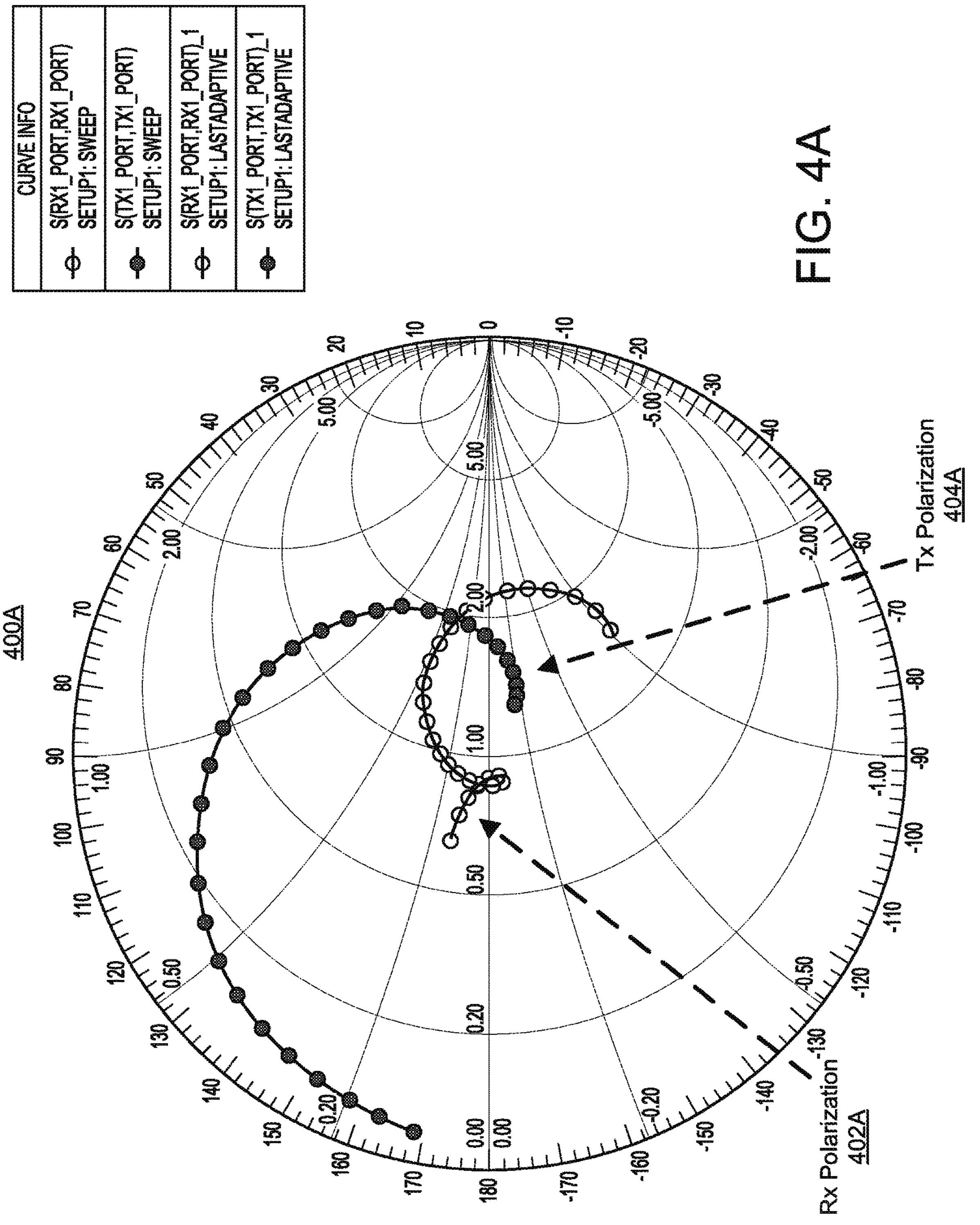
FIGS. 4A-4J illustrate various plots or graphs of scans associated with higher order floquet mode scattering symmetrical dual polarized radiating element, according to an example.
Figure 4B:
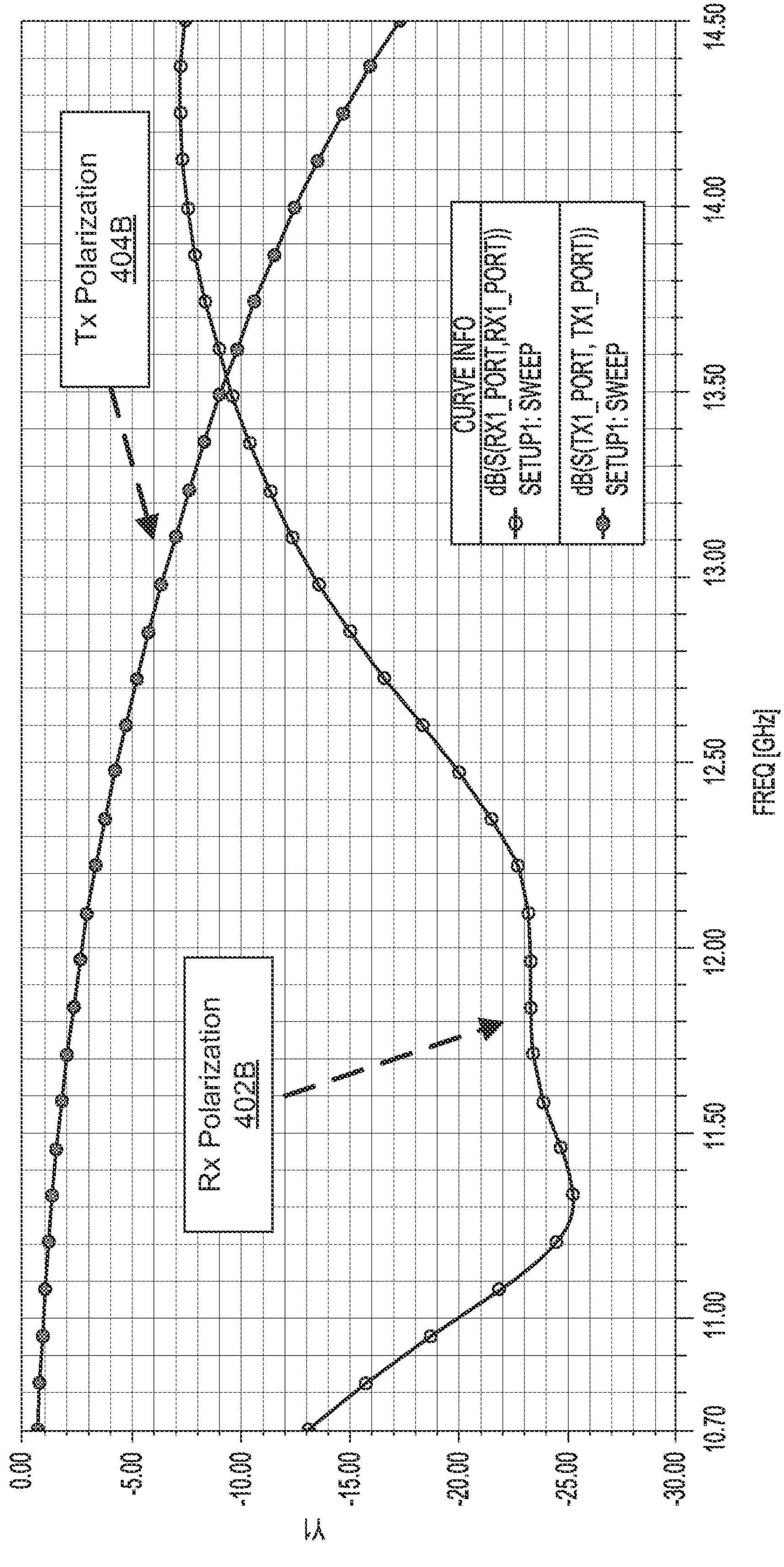

FIGS. 4A-4J illustrate various plots or graphs 400A-400J of scans associated with higher order floquet mode scattering symmetrical dual polarized radiating element, according to an example. Plot 400A of FIG. 4A illustrates return loss from an array normal scan according to an example. The plot 400A is a Smith chart 10.7-14.5 GHz that depicts receiver (Rx) polarization 402A and transmitter (Tx) polarization 404A. Plot 400B of FIG. 4B illustrates return loss from an array normal scan according to an example. The plot 400B is a Rectangular plot that depicts receiver (Rx) polarization 404B and transmitter (Tx) polarization 404B, which respectively correspond to receiver (Rx) polarization 402A and transmitter (Tx) polarization 404A as shown in FIG. 4A.

Figure 4C:
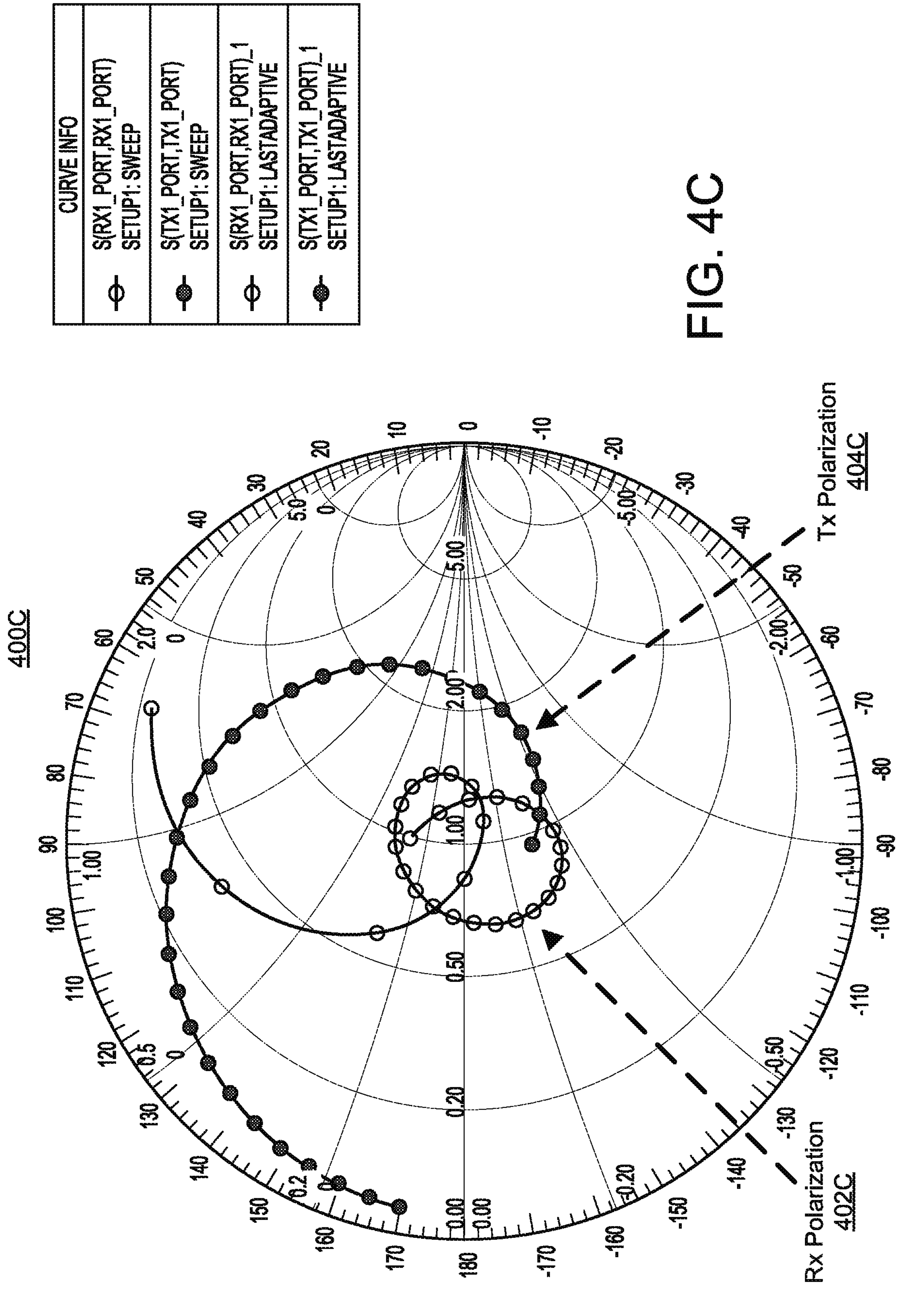
Figure 4D:
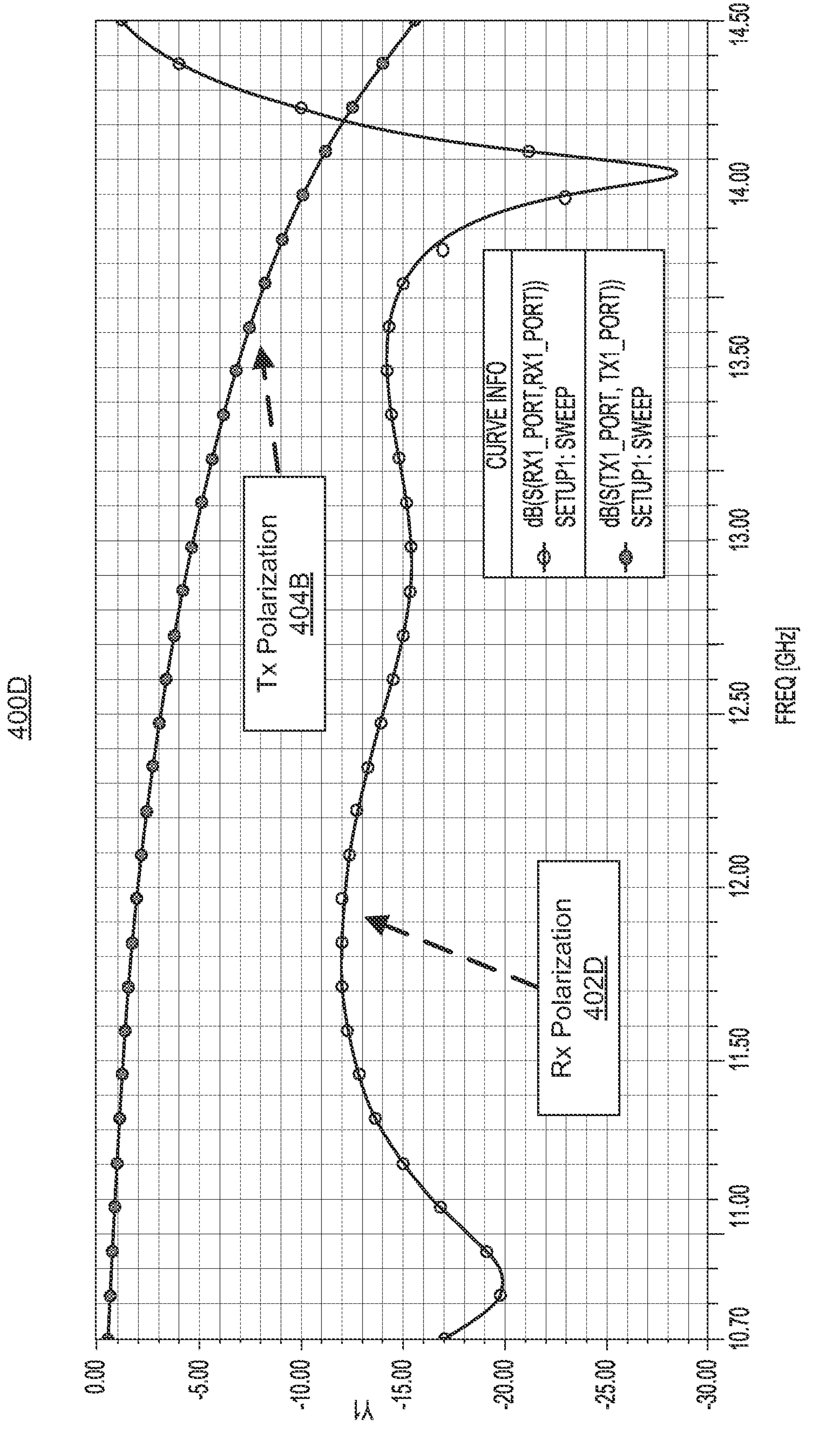

Plot 400C of FIG. 4C illustrates return loss from an array scan theta (8)=45 degrees and phi=0 degrees according to an example. The plot 400C is a Smith chart 10.7-14.5 GHz that depicts receiver (Rx) polarization 402C and transmitter (Tx) polarization 404C when theta (8)=45 degrees and phi=0 degrees. Plot 400D of FIG. 4D is a rectangular plot that depicts receiver (Rx) polarization 402D and transmitter (Tx) polarization 404B, return loss for theta (θ)=45 degrees and phi=0 degrees.

Figure 4E:
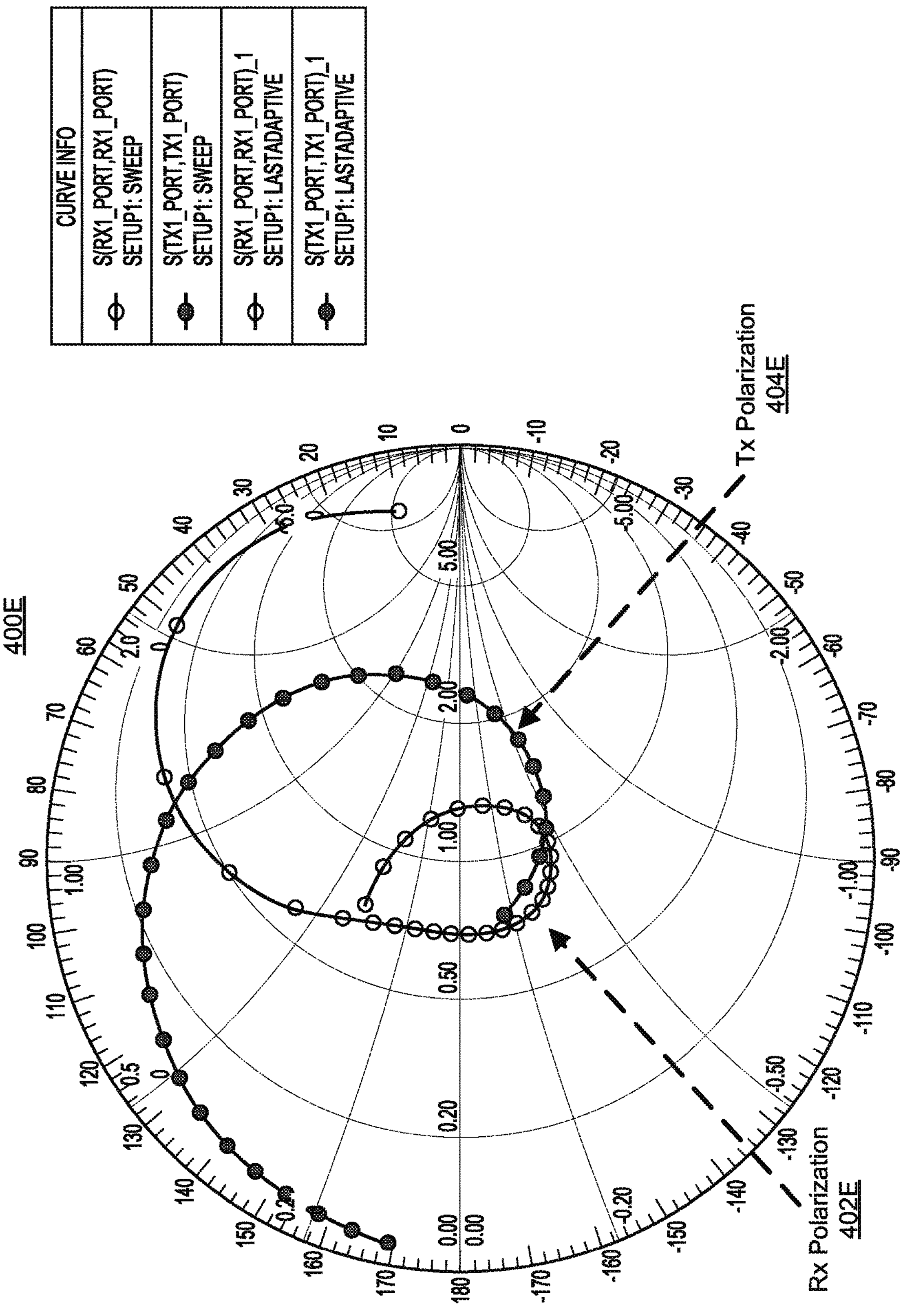
Figure 4F:
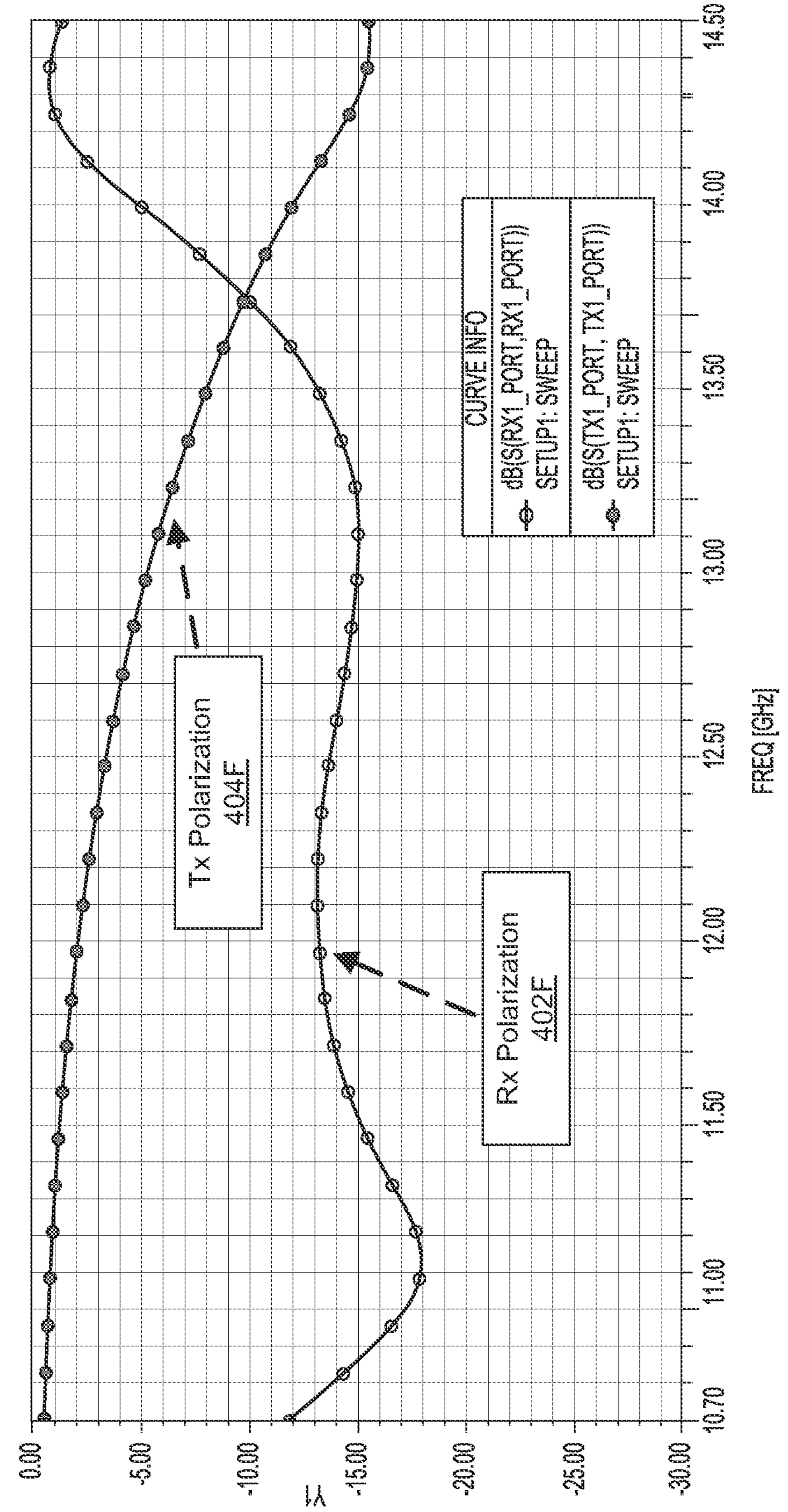

Plot 400E of FIG. 4E illustrates the return loss for an array scan of theta (θ)=45 degrees and phi=56.97621 degrees according to an example. The plot 400E is a Smith chart for the case where the grating lobe is closest to visible space. This is the non-equilateral triangular grid case. The receiver (Rx) polarization 402E and transmitter (Tx) polarization 404E are shown in FIG. 4E. Plot 400F of FIG. 4F illustrates a Rectangular plot that depicts receiver (Rx) 402F polarization and transmitter (Tx) 404F, which respectively correspond to receiver (Rx) polarization 402E and transmitter (Tx) polarization 404E as shown in FIG. 4E.

Figure 4G:
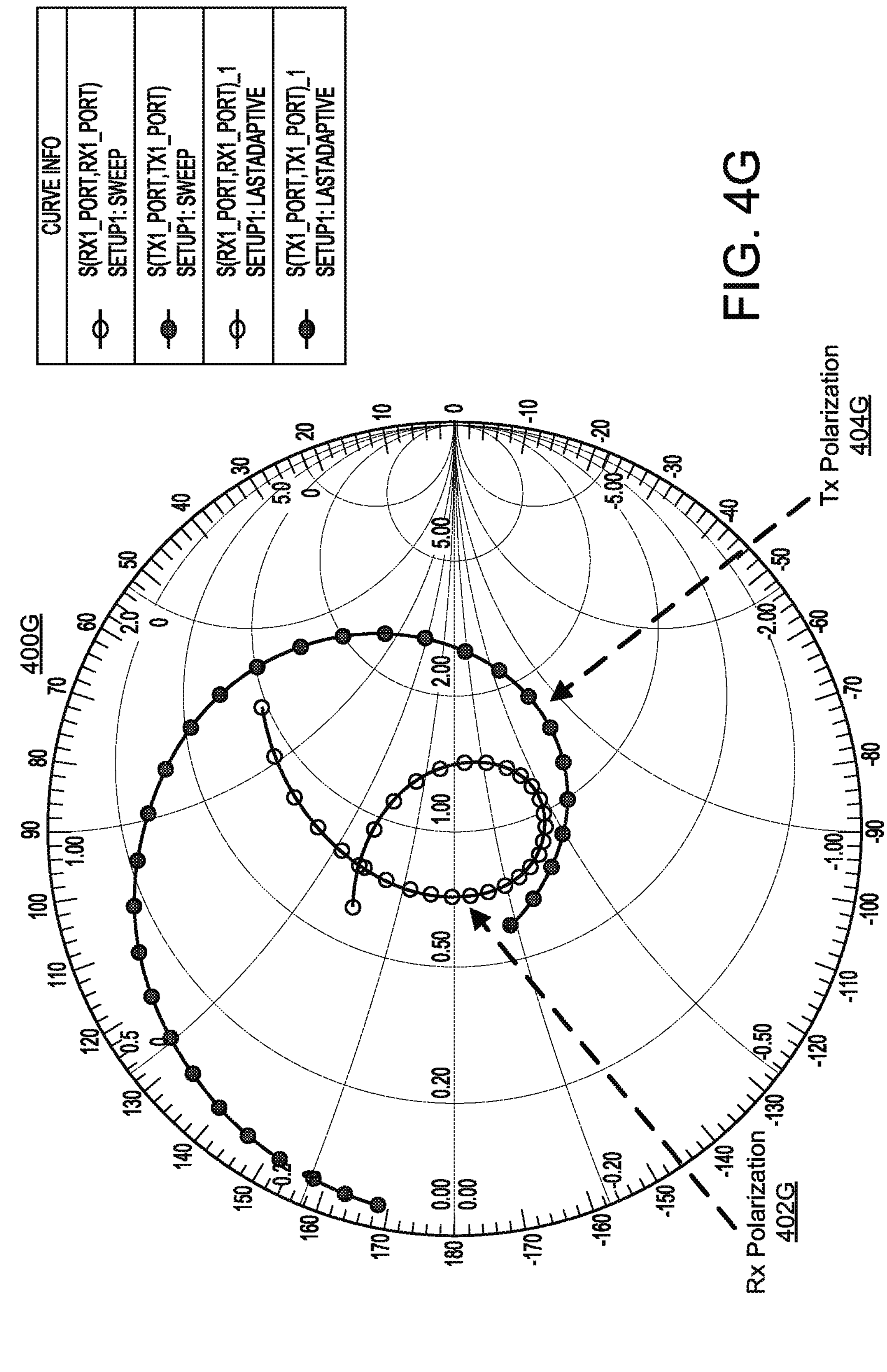
Figure 4H:
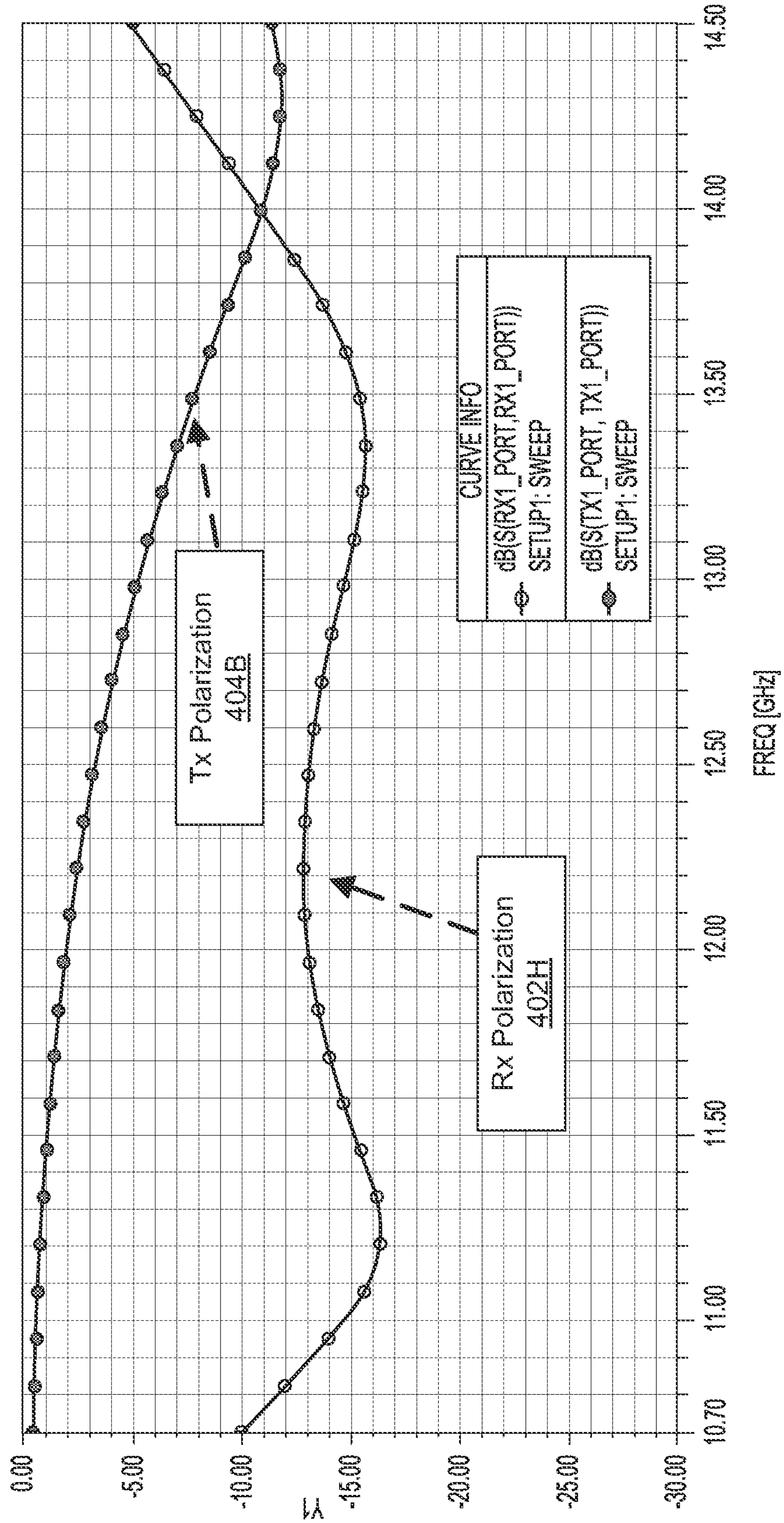

Plot 400G of FIG. 4G illustrates the return loss for an array scan of theta (θ)=45 degrees and phi=90 degrees according to an example. The plot 400G is a Smith chart that depicts receiver (Rx) polarization 402G and transmitter (Tx) polarization 404G. Plot 400H of FIG. 4H illustrates a Rectangular plot that depicts receiver (Rx) 402H polarization and transmitter (Tx) 404H, which respectively correspond to receiver (Rx) polarization 402G and transmitter (Tx) polarization 404G as shown in FIG. 4G.

Figure 4I:
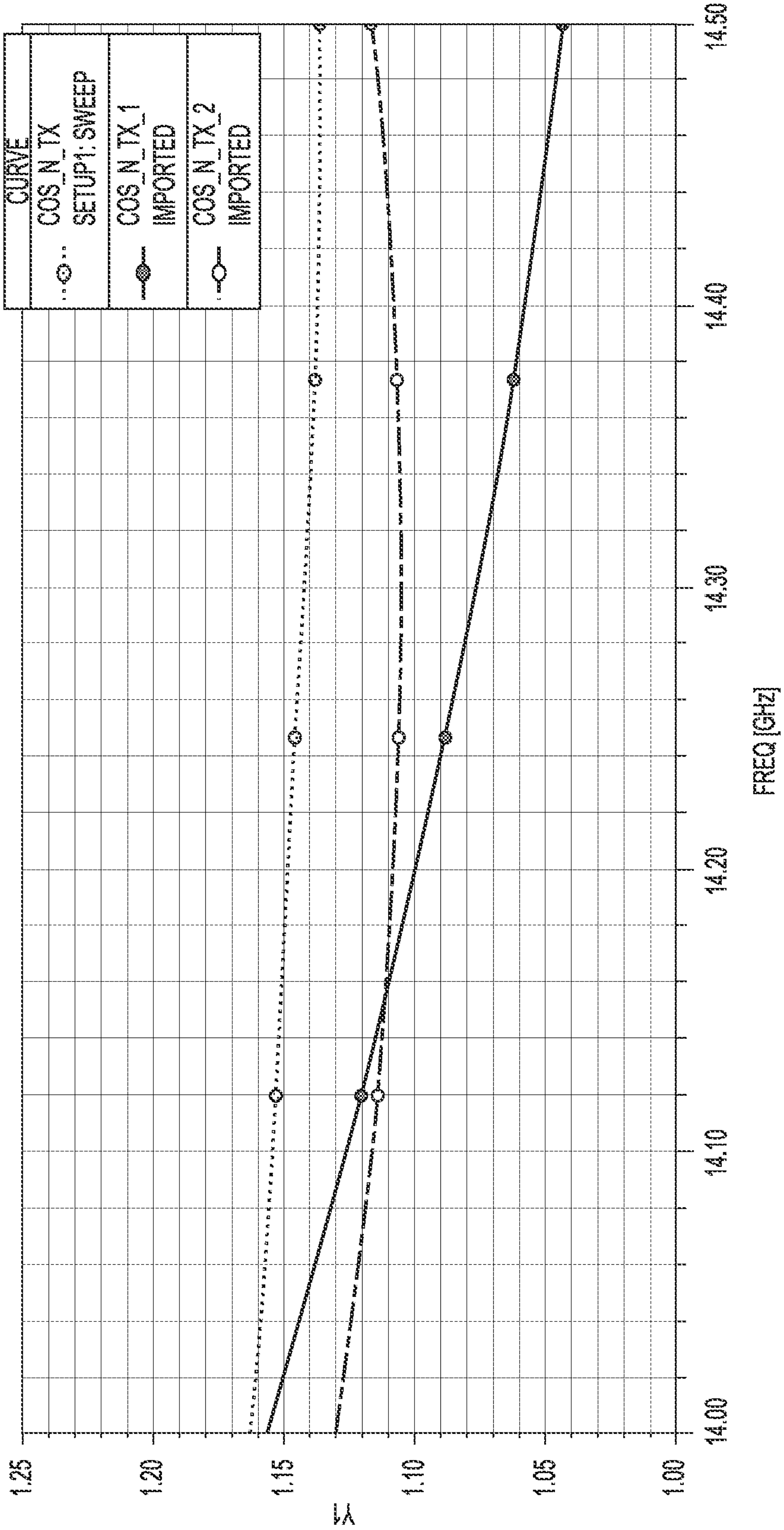

Graph 400I of FIG. 4I illustrates transmitter (Tx) polarization gain, according to an example. The graph 400I may depict transmitter (Tx) polarization gain=$\cos^n(\theta)$ as a function of frequency for a 45 degree scan with effects of the cross talk included, where:

$$n = 1 + \frac{\log_{10}\left(1 - (s11)^2 - (s12)^2\right)}{\log_{10}(\cos(\theta))}, \text{ and } \theta = 0,\ 56.97613,\ 90.$$

Figure 4J:
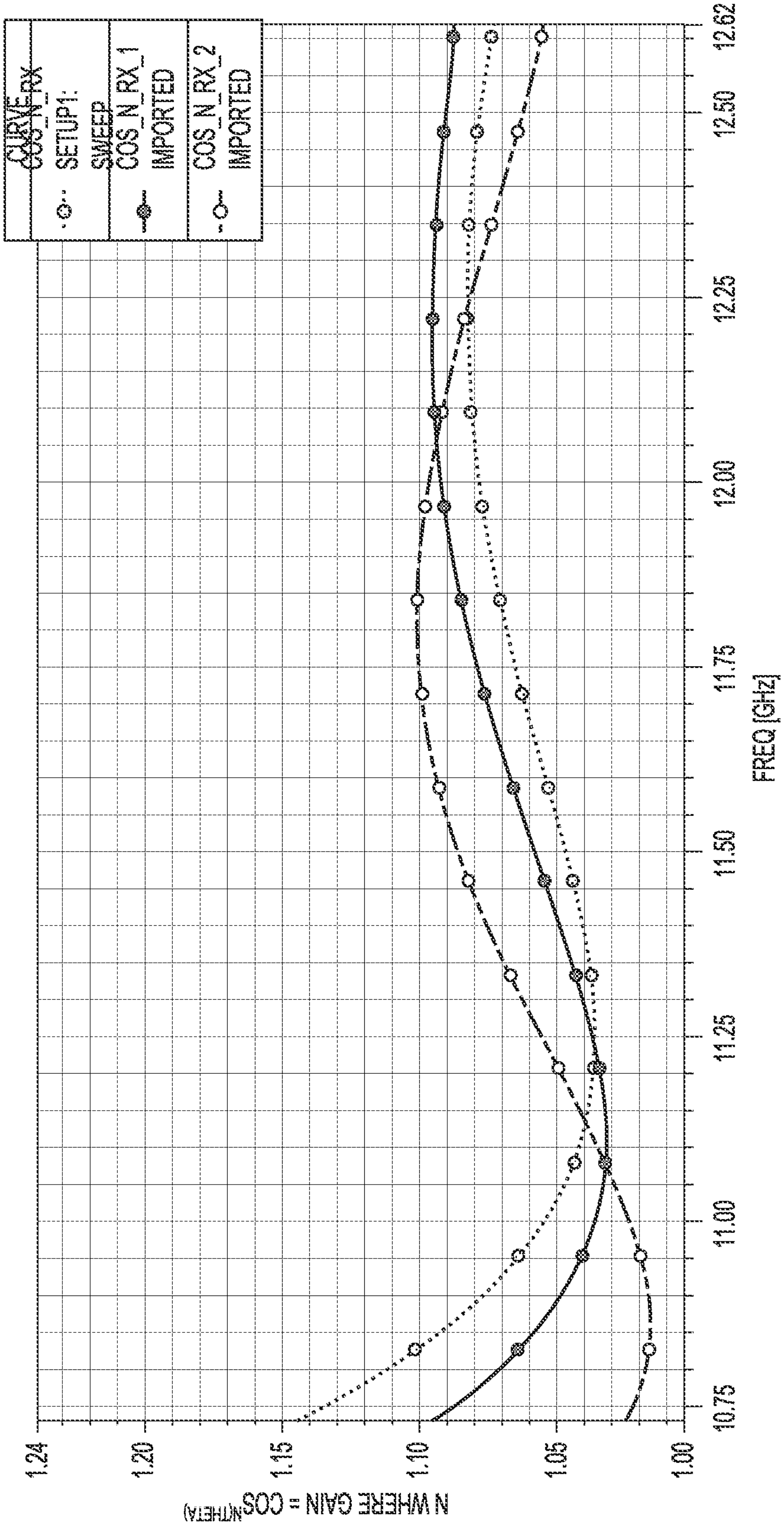

Graph 400J of FIG. 4J illustrates receiver (Rx) polarization gain, according to an example. The graph 400J may depict receiver (Rx) polarization gain=$\cos^n(\theta)$ as a function of frequency for a 45 degree scan with effects of the cross talk included, where 'n' and phi are similar or the same as described above.

Figure 5:
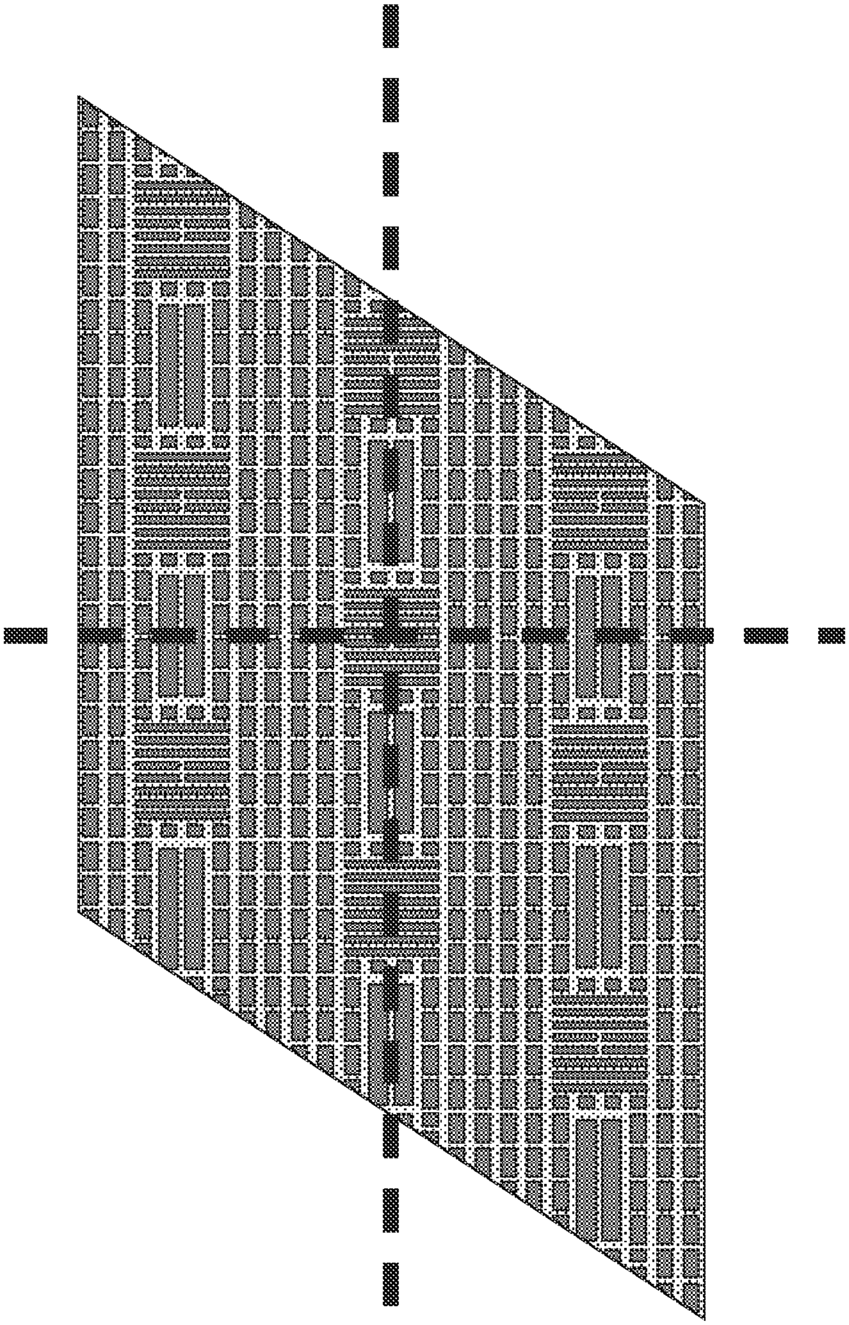
FIG. 5 illustrates a top-down view of a layer associated with a 3×3 element configuration, according to an example.

FIG. 5 illustrates a top-down view 500 of a layer associated with a 3×3 element configuration, according to an example. As shown, this may be a top-down view of 500 of a highest HOFs layers in a 3×3 element configuration where the element may be symmetrical with respect to horizontal and vertical axes. This symmetry may provide for at least some of the benefits and advantages described herein.

For example, the systems and methods described herein may provide a high-performance radiating element with a large unit cell size ($0.3125\lambda^2$ instead of the industry standard $0.25\lambda^2$). In some examples, the large unit cell size may reduce cost, heat load, and/or packaging difficulties. Moreover, the radiating element described herein may use low-loss FR4 material (or other similar material) to reduce cost and manufacturing challenges. Additionally, the radiating element described herein may have a non-equilateral triangular grid and/or an evanescent waveguide mode stripline feed. The symmetry built into the element may also result in low cross-talk and higher quality scan performance.

By providing a higher order floquet mode scattering (HOFS) symmetric dual polarized radiating element, the system and methods described herein may efficiently provide a cost-effective approach so solve problems associated with conventional AESA performance. The examples described herein also provide mechanical simplicity and adaptability to small or large satellite communication systems. Ultimately, the systems and methods described herein may increase efficiency, reduce cost, maximize existing equipment, minimize adverse effects of traditional systems, and provide enhanced performance.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A radiating element comprising:

a plurality of higher order floquet mode scattering (HOFS) layers including at least a lowest layer unit cell, a middle layer unit cell, and a highest layer unit cell; and a stripline feed layer comprising: a ground plane layer, one or more horizontal and vertical polarization stripline feeds, one or more horizontal and vertical polarization ground plane slots, and one or more ground vias, wherein the stripline feed layer creates an evanescent waveguide for resonance free stripline to radiating element coupling;

wherein the radiating element is aperture coupled with an active electronically scanned array (AESA) in a manner so as to enable the AESA to electronically steer a beam of radio waves to point in different directions without moving the AESA and radiate beams of radio waves at multiple frequencies simultaneously.

2. The radiating element of claim 1, wherein each of the at least the lowest layer unit cell, the middle layer unit cell, and the highest layer unit cell comprises a low loss FR-4 material and a PCB metal.

3. The radiating element of claim 1, wherein the stripline feed layer comprises two or more low loss FR-4 cores.

4. The radiating element of claim 1, wherein the radiating element is associated with a phased array antenna comprising Active Electronically Scanned Arrays (AESA).

5. The radiating element of claim 1, wherein each of the stripline feed layer, the low layer, the middle layer, and the high layer is made up of low loss material and PCB metal.

6. The radiating element of claim 1, wherein the radiating element facilitates scan performance and frequency bandwidth by at least one of: having a 0.3125λ2 unit cell, reducing module count, and being symmetrical to minimize cross talk between horizontal and vertical polarizations and cross polarization in inter-cardinal plane scans.

7. The radiating element of claim 1, wherein the ground plane layer is configured in at least one of a non-equilateral triangular grid unit cell or an equilateral triangular grid.

8. A system comprising:

a radiating element comprising:

a plurality of higher order floquet mode scattering (HOFS) layers, comprising a lowest layer unit cell, a middle layer unit cell, and a highest layer unit cell; and a stripline feed layer comprising at least one of a ground plane layer, one or more horizontal and vertical polarization stripline feeds, one or more horizontal and vertical polarization ground plane slots, or one or more ground vias, wherein the stripline feed layer creates an evanescent waveguide for resonance free stripline to radiating element coupling;

wherein the radiating element is aperture coupled with an active electronically scanned array (AESA) in a manner so as to enable the AESA to electronically steer a beam of radio waves to point in different directions without moving the AESA and radiate beams of radio waves at multiple frequencies simultaneously.

9. The system of claim 8, wherein the radiating element facilitates scan performance and frequency bandwidth.

10. The system of claim 8, wherein the radiating element is a higher order floquet mode scattering (HOFS) symmetric dual polarized radiating element.

11. The system of claim 8, wherein the radiating element is associated with phased array antenna comprising Active Electronically Scanned Arrays (AESA).

12. The system of claim 8, wherein the stripline feed layer, lowest layer unit cell, middle layer unit cell, and highest layer unit cell are arranged in a printed circuit board (PCB) stack.

13. The system of claim 12, wherein the printed circuit board (PCB) stack is arranged as follows: the low layer unit cell is provided on top of the stripline feed layer; the middle layer unit cell is provided on top of the lowest layer unit cell; and the highest layer unit cell is provided on top of the middle layer unit cell.

14. The system of claim 8, wherein each of the stripline feed layer, the lowest layer unit cell, the middle layer unit cell, and the highest layer unit cell is made up of low loss material and PCB metal.

15. The system of claim 14, wherein the low loss material is a flame retardant epoxy resin (FR4) material.

16. The system of claim 8, wherein the radiating element facilitates scan performance and frequency bandwidth by at least one of: having a 0.3125λ2 unit cell, reducing module count, or being symmetrical to minimize cross talk between horizontal and vertical polarizations and cross polarization in inter-cardinal plane scans.

17. The system of claim 8, wherein the ground plane layer is configured in at least one of a non-equilateral triangular grid unit cell or an equilateral triangular grid.

18. An apparatus comprising a higher order floquet mode scattering symmetrical dual polarized radiating element, the radiating element comprising:

a plurality of higher order floquet mode scattering (HOFS) layers including at least a lowest layer unit cell, a middle layer unit cell, and a highest layer unit cell, each comprising low loss flame retardant epoxy resin (FR-4) material and a PCB metal; and a stripline feed layer comprising two or more low loss FR-4 cores, wherein the stripline feed layer further comprises a ground plane layer, one or more horizontal and vertical polarization stripline feeds, one or more horizontal and vertical polarization ground plane slots, and one or more ground vias to create an evanescent waveguide for resonance free stripline to radiating element coupling.

19. The apparatus of claim 18, wherein the radiating element is associated with a phased array antenna comprising Active Electronically Scanned Arrays (AESA) in a manner so as to enable the AESA to electronically steer a beam of radio waves to point in different directions without moving the AESA and radiate beams of radio waves at multiple frequencies simultaneously.

20. The apparatus of claim 18, wherein the ground plane layer is configured in at least one of a non-equilateral triangular grid unit cell or an equilateral triangular grid.

* * * * *